UNITED STATES PATENT OFFICE.

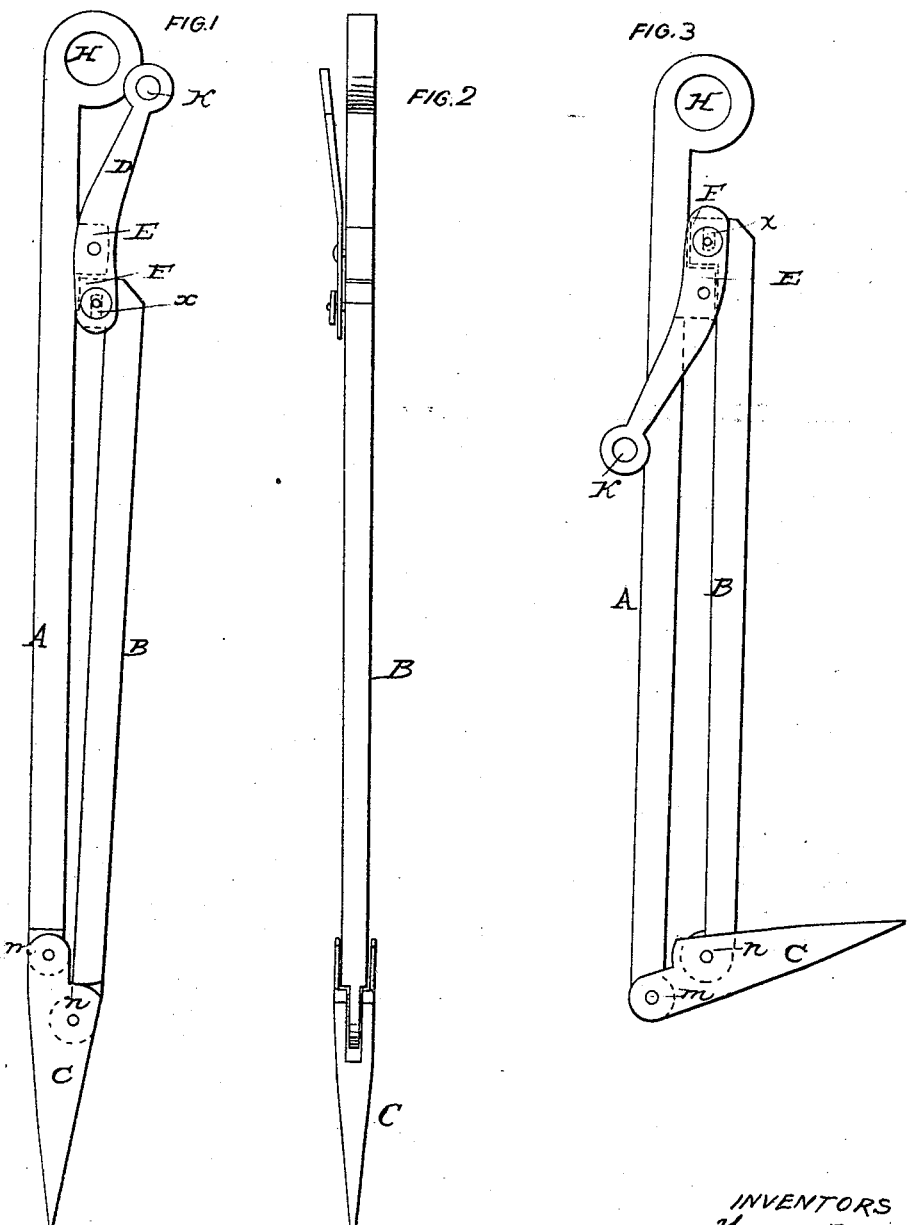

HENRY FISHER AND MILTON BALL, OF CANTON, OHIO.

IMPROVEMENT IN HORSE HAY-FORKS.

Specification forming part of Letters Patent No. 53,286, dated March 20, 1866.

*To all whom it may concern:*

Be it known that we, HENRY FISHER and MILTON BALL, of Canton, county of Stark, and State of Ohio, have invented certain new and useful Improvements in Hay-Elevators; and we do hereby declare that the following is a full, clear, and exact description of the same, reference being had to the accompanying drawings, and the letters of reference marked thereon, making a part of this specification.

In the drawings hereto annexed and forming a part of this specification, A represents a metallic bar with an opening at the upper end, as seen at H, the purpose of which to be hereinafter described. A short distance below the said opening is a shoulder, as seen in dotted lines at E.

B is a bar of metal shorter than the bar A, having at its upper end a shoulder, F. This bar B is secured parallel to the bar A, as will be hereinafter set forth.

C represents a spear, which is made in the form represented, said spear having an opening cut in the edge of it to receive the metallic bars A and B. The bars A and B are set within the opening in the spear C and pivoted, respectively, as seen at *m* and *n*.

D represents a lever, which is slightly crooked, and connects the upper end of the bar B at its shoulder F to the shoulder E in the bar A. This lever D has an opening, K, at the upper end and a slot cut in it where it is attached to the shoulder F, as seen at *x*.

The invention herein described is for the purpose of elevating hay from wagons, stacks, or other places into a barn or other receptacle, and is operated in the following manner: A beam with block and tackle attached is placed at the place where the hay is to be elevated, the rope of said block and tackle being attached to the elevator at the opening in the bar A, as seen at H. A rope is secured to the lever D at K, and held by some person either on the ground or in the receptacle. The elevator is then lowered to the hay while in the position as shown in Figure 1, and the spear pressed into the hay. The lever D is then brought past the bar A by the person holding the cord attached to said lever, which throws the bar B from the bar A, raising the point of the spear C, where the hay rests, and carrying the shoulder F on the bar B above the shoulder E on bar A, where the bar B, which supports the hay on the spear and the spear itself, is in the position as shown in Fig. 3 of accompanying drawings. The elevator is then drawn to the required height, when the lever D is raised and the shoulder F passes the shoulder E. The point of the spear C drops when the hay is put in the desired place. The operation is thus continued until the necessary work is performed.

The advantages of this invention will be readily seen, requiring but little labor to perform the work and doing the same expeditiously and well, while the invention itself can be gotten up at little expense.

Having thus fully described our invention, what we claim as new, and desire to secure by Letters Patent, is—

The bars A and B, provided with the shoulders E and F, the slotted lever D, and the spear C, the several parts being constructed and arranged to operate as and for the purpose herein specified.

As evidence that we claim the foregoing we have hereunto set our hands in the presence of two witnesses.

HENRY FISHER.
MILTON BALL.

Witnesses:
GEO. W. RAFF,
J. M. MASON.